United States Patent
Arich De Finetti et al.

(10) Patent No.: US 12,312,425 B2
(45) Date of Patent: May 27, 2025

(54) CONTINUOUS SOLUTION POLYMERIZATION PROCESS

(71) Applicant: BASELL POLIOLEFINE ITALIA S.R.L., Milan (IT)

(72) Inventors: Nicolo Arich De Finetti, Ferrara (IT); Pietro Baita, Ferrara (IT); Antonio Mazzucco, Ferrara (IT); Roberta Pica, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 634 days.

(21) Appl. No.: 17/776,117

(22) PCT Filed: Nov. 3, 2020

(86) PCT No.: PCT/EP2020/080795
§ 371 (c)(1),
(2) Date: May 11, 2022

(87) PCT Pub. No.: WO2021/099106
PCT Pub. Date: May 27, 2021

(65) Prior Publication Data
US 2022/0396649 A1 Dec. 15, 2022

(30) Foreign Application Priority Data
Nov. 18, 2019 (EP) .................... 19209618

(51) Int. Cl.
*C08F 210/16* (2006.01)
*C08F 2/02* (2006.01)
*C08F 210/14* (2006.01)

(52) U.S. Cl.
CPC .............. *C08F 210/16* (2013.01); *C08F 2/02* (2013.01); *C08F 210/14* (2013.01)

(58) Field of Classification Search
CPC ........ C08F 210/16; C08F 210/14; C08F 2/02; C08F 4/6592
See application file for complete search history.

(56) References Cited

U.S. PATENT DOCUMENTS

| | | | | |
|---|---|---|---|---|
| 5,767,208 A | * | 6/1998 | Turner | C08F 210/18 526/132 |
| 6,054,544 A | * | 4/2000 | Finlayson | C08F 210/16 585/12 |
| 7,534,848 B2 | * | 5/2009 | Resconi | C08F 210/08 526/943 |
| 7,910,679 B2 | * | 3/2011 | Kiss | C08F 210/16 526/348.3 |
| 7,964,679 B2 | * | 6/2011 | Resconi | C08F 10/00 526/170 |
| 8,399,586 B2 | | 3/2013 | Kiss et al. | |
| 10,894,850 B2 | * | 1/2021 | Marchini | C08F 4/65927 |

FOREIGN PATENT DOCUMENTS

| | | | | |
|---|---|---|---|---|
| CN | 1662565 A | 8/2005 | | |
| CN | 101945899 A | 1/2011 | | |
| CN | 102050905 A | 5/2011 | | |
| CN | 102971346 A | 3/2013 | | |
| EP | 1515998 A1 | 3/2005 | | |
| EP | 3266824 A1 | 1/2018 | | |
| WO | WO-9722635 A1 | * 6/1997 | | C08F 10/00 |
| WO | 2004000891 A1 | 12/2003 | | |

OTHER PUBLICATIONS

International Search Report and Written Opinion Mailed Jan. 27, 2021 (Jan. 27, 2021) for corresponding PCT/EP2020/080795.

* cited by examiner

Primary Examiner — Rip A Lee

(57) ABSTRACT

A process for the continuous solution polymerization including the step of polymerizing a first olefin monomer of formula $CH_2=CHR^1$, wherein $R^1$ is hydrogen or a hydrocarbon radical having from 1 to 8 carbon atoms with a second olefin monomer of formula $CH_2=CHR^2$, wherein $R^2$ is a hydrocarbon radical having from 3 to 8 carbon atoms, in the presence of a polymerization catalyst and in the absence of an inert solvent, at a polymerization temperature (Tp) satisfying the following relationship:

$Tp \geq Tm+20°$ C.

wherein Tm is the melting temperature of the obtained polymer.

7 Claims, No Drawings

CONTINUOUS SOLUTION POLYMERIZATION PROCESS

This application is the U.S. National Phase of PCT International Application PCT/EP2020/080795, filed Nov. 3, 2020, claiming benefit of priority to European Patent Application No. 19209618.8, filed Nov. 18, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a continuous solution polymerization process.

BACKGROUND OF THE INVENTION

In some instances, continuous solution olefin polymerization processes entail preparing a solution of the olefin monomer(s) in a solvent. The solution is then contacted with a catalyst for polymerization. In some instances, the liquid reaction medium is made from or containing the olefin monomer(s) and an inert hydrocarbon solvent. In some instances, the obtained polyolefin is soluble in the liquid medium.

In some instances, the polymerization of 1-butene occurs in the absence of a polymerization inert solvent because poly-1-butene is soluble in the liquid monomer at polymerization conditions.

In some instances, other olefins, such as ethylene, propylene, or higher alpha-olefins, are polymerized in solution phase in the presence of an inert solvent. In those instances, the obtained polyolefins are not soluble in the liquid monomer at polymerization conditions.

In some instances, use of the inert solvent involves a solvent storage system and a solvent recovery section for removing the inert solvent from the obtained polymer.

SUMMARY OF THE INVENTION

In a general embodiment, the present disclosure provides a process for the continuous solution polymerization including the step of polymerizing a first olefin monomer of formula $CH_2=CHR^1$, wherein $R^1$ is hydrogen or a hydrocarbon radical having from 1 to 8 carbon atoms with a second olefin monomer of formula $CH_2=CHR^2$, wherein $R^2$ is a hydrocarbon radical having from 3 to 8 carbon atoms, in the presence of a polymerization catalyst and in the absence of an inert solvent, at a polymerization temperature (Tp) satisfying the following relationship:

$$Tp \geq Tm+20° C.$$

wherein Tm is the melting temperature of the obtained polymer.

In some embodiments, the process is performed in the absence of the process sections of:
 solvent logistics,
 solvent storage and pumping, and
 solvent purification.
In some embodiments, the recovery section of the presently-disclosed process for the continuous solution polymerization is simplified when compared to a process for the continuous solution polymerization which uses an inert solvent.

DETAILED DESCRIPTION OF THE INVENTION

As used herein, the term "polymer melt" refers to an olefin polymer in the molten state having a viscosity of at least $10^6$ centiPoise and which a gear pump can transfer.

In some embodiments, the process is carried out at a polymerization temperature (Tp) satisfying the relationship $Tp \geq Tm+20°$ C., alternatively $Tp \geq Tm+25°$ C., alternatively $Tp \geq Tm+30°$ C., wherein Tm is the melting temperature of the obtained polymer.

In some embodiments, the polymerization catalyst is a Ziegler-Natta catalyst system and/or a single-site catalyst system made from or containing a metallocene compound and an alumoxane, as the catalyst activator.

In some embodiments, the process is performed in one or more continuously stirred tank reactors (CSTR) or in one or more static mixer reactors (SMR). In some embodiments, the temperature in the reactor is held down by an external heat exchanger.

A solution of a polyolefin in the reaction medium is obtained from the polymerization step. In some embodiments, the reaction medium is made from or containing the unreacted monomers.

In some embodiments, the first olefin monomer of formula $CH_2=CHR^1$, wherein $R^1$ is hydrogen or a hydrocarbon radical having 2 to 8 carbon atoms, is selected from the group consisting of ethylene, propylene, 1-butene, 1-pentene, 1-hexene, 4-methyl-1-pentene, 1-octene and 1-decene.

In some embodiments, the second olefin monomer of formula $CH_2=CHR^2$, wherein $R^2$ is a hydrocarbon radical having 5 to 8 carbon atoms, is selected from the group consisting of 1-pentene, 1-hexene, 4-methyl-1-pentene, 1-octene and 1-decene.

In some embodiments, the first olefin monomer is ethylene and the second olefin monomer is 1-octene.

In some embodiments, the content of the second olefin monomer in the obtained polymer products is between 5 and 50% by weight, alternatively between 10 and 45% by weight, alternatively between 15 and 40% by weight.

In some embodiments, weight regulators are used to control the molecular weight of the obtained polyolefins. In some embodiments, the weight regulators are hydrogen.

In some embodiments, the polymerization is operated at temperatures higher than 60° C., alternatively in the range of from 60 to 150° C., alternatively from 80 to 120° C.

In some embodiments, the polymerization is operated at pressures lower than 50 barg, alternatively in the range of from 20 to 50 barg, alternatively from 25 to 40 barg.

In some embodiments, the residence time of the liquid reaction medium inside the polymerization apparatus is between 20 minutes and 200 minutes, alternatively between 60 minutes and 180 minutes.

In some embodiments, a viscous polymeric solution is discharged from the polymerization reactor. In some embodiments, the viscosity of the obtained polymeric solution does not prohibitively affect stirring and/or processing the polymeric solution downstream the polymerization section. In some embodiments, the viscosity of the polymeric solution is between 1000 and 100000 centiPoise.

The polymeric solution discharged from the polymerization is transferred to the downstream separation step where the unreacted monomers are removed from the obtained polyolefin particles. In some embodiments, a volumetric pump is used for the transfer. In some embodiments, the unreacted monomers are removed by a melt devolatilization technique, which starting from the polymer solution leads to remove the volatile components from the produced polyolefin, which is separated in the form of a polymer melt.

In some embodiments and after the catalyst components are deactivated in the polymer solution, the melt devolatilization technique occurs in the temperature range of 150-220° C. It is believed that the catalyst deactivation avoids further uncontrolled polymerization, thermal degradation of the polymer during the volatilization step, and uncontrolled reactions of the catalyst residues which yield by-products affecting the polymer quality (for example, color). In some embodiments, the deactivation of the polymeric solution is performed in one or more mixing tanks placed in series or, alternatively, in a single deactivation apparatus equipped with a sequence of more mixing stages. In some embodiments, the deactivating compounds are water or organic compounds having a boiling point higher than 150° C. and at least a hydroxy group. In some embodiments, the deactivating compounds are selected from the group consisting of water, propylene glycol, dipropylene glycol, and glycerol.

After the catalyst deactivation, the polymeric solution is subjected to heating by flowing inside a heat exchanger, thereby increasing the polymeric solution's temperature to between 120° C. and 250° C. It is believed that the selected temperature relates to the volatility of the monomers and inert solvents to be recovered in the separation step. In some embodiments, a multi-tube heat exchanger with static mixing elements inserted inside each tube as used, as described in Patent Cooperation Treaty Publication No. WO 04/000891. In some embodiments, a plurality of static mixing elements inside each tube mixes the polymeric solution intensely. It is believed that the elements mix the outermost and the innermost veins of the flowing stream, thereby providing heat transfer between the different threads of fluid. In some embodiments, a homogenous distribution of temperature is obtained in the polymer solution. In some embodiments and as static elements, mixing rods are inserted in the tubes of the heat exchanger.

In some embodiments, the separation step is performed by one or more volatilization chambers. In some embodiments, two or more volatilization chambers are operated at a decreasing pressure. In some embodiments, the separation step is performed by a sequence of three volatilization chambers.

In some embodiments and at the outlet from the heat exchanger, the polyolefin solution is introduced in the upper portion of a first volatilization chamber, which is operated at a temperature from 120° C. to 250° C. and a pressure from 5 to 20 bar, alternatively from 10 to 15 bar. In the first volatilization chamber, the different components of the polyolefin solution are separated. In some embodiments, the polyolefin falls downward by gravity as a polymer melt while the volatile components are released from the polyolefin as a gaseous stream and flow upward to the top of the volatilization chamber. In some embodiments, the volatile components are mostly olefin monomers and comonomers. During the vertical drop of the polymer melt along the first volatilizer, the unreacted (co)monomers are released away, thereby reducing the content of unreacted (co)monomers in the polyolefin melt to less than 5% by weight at the discharge from the first volatilizer.

In some embodiments, the second devolatilization chamber is operated at a higher temperature with respect to the first chamber, thereby further heating the polyolefin melt in a second multi-tube heat exchanger at the outlet from the first volatilizer. It is believed that the heat exchanger adjusts the temperature of the polymer melt up to the value requested in the second devolatilization chamber. In some embodiments, the temperature in the second devolatilization chamber is adjusted at a value from 180 to 250° C. while the pressure is maintained close to the atmospheric value, in a range from 0.8 to 5.0 bar, alternatively from 1.0 to 3.0 bar. In some embodiments, it is believed that the temperature-increase and the pressure-decrease cause the release of the residual amounts of olefin (co)monomers and the inert solvent from the polyolefin melt as a gaseous stream, which gaseous stream flows upward to the top of the second volatilization chamber. Simultaneously, the polyolefin melt drops by gravity and settles at the bottom of the second volatilizer. In some embodiments, the content of unreacted monomers in the polyolefin melt is reduced to less than 1% by weight at the discharge from the second volatilizer.

Successively, the polyolefin melt withdrawn from the second volatilizer is introduced into a third devolatilization chamber, operated at the same temperature range of the second volatilizer, but under vacuum conditions. A vacuum pump is arranged on the line transferring the gaseous components from the top of this volatilizer to the monomer recovery section. In some embodiments, the vacuum pump establishes a high degree of vacuum inside the third chamber. In some embodiments, the pressure is between 5 and 100 mbar, alternatively between 10 and 25 mbar. Said it is believed that the vacuum conditions release residual amounts of monomers and inert solvent during the vertical drop and settling of the polyolefin melt along the third volatilization chamber. In some embodiments, the total content of monomers is negligible and the content of inert solvent in the polyolefin melt is strongly reduced, at the outlet from the third volatilizer. In some embodiments, the total content of monomers is lower than 50 ppm weight. In some embodiments, the content of inert solvent in the polyolefin melt is up to less than 500 ppm weight.

In some embodiments, the polyolefin melt obtained at the bottom of each volatilizer has a viscosity of at least $10^6$ cP. In some embodiments, gear pumps are used to extract the polymer melt from the bottom of each devolatilization chamber. In some embodiments, the gear pump is directly coupled to the bottom flange of each volatilizer, thereby priming the pump and conveying the polyolefin melt to the following process steps.

In some embodiments, the gaseous streams collected at the top of each volatilizer contain little amounts of other volatile components. In some embodiments, the volatile components are selected from the group consisting of oligomers, catalyst deactivators and by-products deriving from the catalyst deactivation. In some embodiments, the monomer recovery section of the polymerization plant separates the volatile compounds from the unreacted (co)monomers. In some embodiments, the monomer recovery section includes one or more distillation columns, a drying unit, and recycle lines of liquid monomers to the polymerization reactor.

In some embodiments, the polymerization reaction is exothermic. In some embodiments, the catalyst is supported or unsupported. In some embodiments, the catalyst is in pre-polymerized form.

In some embodiments, the polymerization reaction is carried out in the presence Ziegler-Natta catalysts, single site catalysts, chromium-based catalysts, or vanadium-based catalysts.

In some embodiments, the Ziegler-Natta catalyst system is made from or containing the catalysts obtained by the reaction of a transition metal compound of groups 4 to 10 of the Periodic Table of Elements (new notation) with an organometallic compound of group 1, 2, or 13 of the Periodic Table of element.

In some embodiments, the transition metal compound is selected from the group consisting of compounds of Ti, V, Zr, Cr, and Hf. In some embodiments, the compounds have the formula $Ti(OR)_nX_{y-n}$ wherein n is between 0 and y; y is the valence of titanium; X is halogen and R is a hydrocarbon group having 1-10 carbon atoms or a COR group. In some embodiments, the compounds are titanium compounds having at least one Ti-halogen bond. In some embodiments, the titanium compounds are selected from the group consisting of titanium tetrahalides or halogenalcoholates. In some embodiments, the titanium compounds are selected from the group consisting of $TiCl_3$, $TiCl_4$, $Ti(OBu)_4$, $Ti(OBu)Cl_3$, $Ti(OBu)_2Cl_2$, and $Ti(OBu)_3Cl$.

In some embodiments, the organometallic compounds are organo-Al compounds, alternatively Al-alkyl compounds. In some embodiments, the alkyl-Al compound is a trialkyl aluminum compound. In some embodiments, the trialkyl aluminum compounds are selected from the group consisting of triethylaluminum, triisobutylaluminum, tri-n-butyl-aluminum, tri-n-hexylaluminum, and tri-n-octylaluminum. In some embodiments, the alkyl-Al compounds are selected from the group consisting of alkylaluminum halides, alkylaluminum hydrides, alkylaluminum sesquichlorides, and mixtures with trialkyl aluminum compounds. In some embodiments, the alkylaluminum sesquichlorides are selected from the group consisting of $AlEt_2Cl$ and $Al_2Et_3Cl_3$.

In some embodiments, the Ziegler-Natta catalysts have the titanium compound supported on magnesium halide in active form. In some embodiments, the magnesium halide is $MgCl_2$. In some embodiments and for preparing crystalline polymers of $CH_2CHR$ olefins, wherein R is a C1-C10 hydrocarbon group, internal electron donor compounds are supported on the $MgCl_2$. In some embodiments, the internal electron donor is selected from the group consisting of esters, ethers, amines, and ketones. In some embodiments, the internal electron donor is selected from the group consisting of 1,3-diethers and cyclic ethers. In some embodiments, the internal electron donor is selected from the group consisting of phthalates, benzoates, acetates, and succinates.

In some embodiments, an external electron-donor (ED) is added to the aluminum alkyl co-catalyst component or to the polymerization reactor. In some embodiments, the external electron donors are selected from the group consisting of alcohols, glycols, esters, ketones, amines, amides, nitriles, alkoxysilanes and ethers. In some embodiments, the electron donor compounds (ED) are used alone or in mixture with other electron donor compounds. In some embodiments, the ED compound is selected from the group consisting of aliphatic ethers, esters and alkoxysilanes. In some embodiments, the ethers are the C2-C20 aliphatic ethers. alternatively cyclic ethers having 3-5 carbon atoms. In some embodiments, the ethers are tetrahydrofuran (THF) or dioxane.

In some embodiments, the esters are the alkyl esters of C1-C20 aliphatic carboxylic acids, alternatively C1-C8 alkyl esters of aliphatic mono carboxylic acids. In some embodiments, the esters are selected from the group consisting of ethylacetate, methyl formiate, ethylformiate, methylacetate, propylacetate, i-propylacetate, n-butylacetate, and i-butylacetate.

In some embodiments, the alkoxysilanes have the formula $R_a^1R_b^2Si(OR^3)_c$, wherein a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. In some embodiments, the silicon compounds are wherein a is 1, b is 1, c is 2, at least one of $R^1$ and $R^2$ is selected from the group consisting of branched alkyl, cycloalkyl and aryl groups with 3-10 carbon atoms and $R^3$ is a $C_1$-$C_{10}$ alkyl group, alternatively methyl.

In some embodiments, the catalysts are vanadium-based catalysts made from or containing the reaction product of a vanadium compound with an aluminum compound, optionally in the presence of a halogenated organic compound. In some embodiments, the vanadium compound is supported on an inorganic carrier. In some embodiments, the inorganic carrier is selected from the group consisting of silica, alumina, and magnesium chloride. In some embodiments, the vanadium compounds are selected from the group consisting of $VCl_4$, $VCl_3$, $VOCl_3$, and vanadium acetyl acetonate.

In some embodiments, the catalysts are based on chromium compounds. In some embodiments, the catalysts are based on chromium oxide on silica. In some embodiments, the catalysts are Phillips catalysts.

In some embodiments, the catalysts are single site catalysts. In some embodiments, the catalysts are metallocene-based catalyst systems made from or containing
  at least a transition metal compound containing at least one n bond,
  at least an alumoxane or a compound able to form an alkyl-metallocene cation, and
  optionally an organo-aluminum compound.

In some embodiments, the metal compounds containing at least one n bond are metallocene compounds having formula (I):

$$Cp(L)_qAMX_p \qquad (I)$$

wherein M is a transition metal belonging to group 4, 5 or to the lanthanide or actinide groups of the Periodic Table of the Elements.

Specification-Clean Version
  the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms;
  p is an integer equal to the oxidation state of the metal M minus 2;
  n is 0 or 1; when n is 0, the bridge L is not present;
  L is a divalent hydrocarbon moiety containing from 1 to 40 carbon atoms, optionally containing up to 5 silicon atoms, bridging Cp and A; Z being C, Si, and the $R^7$ groups, equal to or different from each other, being hydrogen or a hydrocarbon radical containing from 1 to 40 carbon atoms;
  Cp is a substituted or unsubstituted cyclopentadienyl group, optionally condensed to one or more substituted or unsubstituted, saturated, unsaturated, or aromatic rings; and
  A has the same meaning as Cp or is a $NR^7$, —O, or S moiety, wherein $R^7$ is a hydrocarbon radical containing from 1 to 40 carbon atoms.

In some embodiments, M is selected from the group consisting of zirconium, titanium, and hafnium. In some embodiments, the substituents X are selected from the group consisting of —Cl, —Br, -Me, -Et, -n-Bu, -sec-Bu, -Ph, —Bz, —$CH_2SiMe_3$, —OEt, —OPr, —OBu, —OBz, and —$NMe_2$. In some embodiments, L is a divalent group $(ZR^7_2)_n$. In some embodiments, L is selected from the group consisting of Si(CH$_3$)$_2$, SiPh$_2$, SiPhMe, SiMe(SiMe$_3$), CH$_2$, (CH$_2$)$_2$, (CH$_2$)$_3$ and C(CH$_3$)$_2$.

In some embodiments, the alumoxanes are linear, branched, or cyclic compounds containing at least one group of the type:

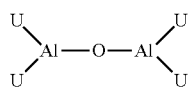

wherein the substituents U, same or different, as defined above.

In some embodiments, alumoxanes having the formula:

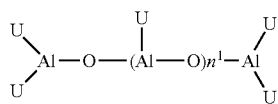

are linear compounds, wherein n$^1$ is 0 or an integer of from 1 to 40 and where the U substituents, same or different, are hydrogen atoms, halogen atoms, C$_1$-C$_{20}$-alkyl, C$_3$-C$_{20}$-cyclalkyl, C$_6$-C$_{20}$-aryl, C$_7$-C$_{20}$-alkylaryl or C$_7$-C$_{20}$-arylalkyl radicals, optionally containing silicon or germanium atoms, with the proviso that at least one U is different from halogen, and j ranges from 0 to 1, being also a non-integer number.

In some embodiments, alumoxanes having the formula:

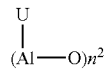

are cyclic compounds, wherein n$^2$ is an integer from 2 to 40 and the U substituents are as defined above.

In some embodiments, the catalyst is employed in the form of a pre-polymer powder. In some embodiments, the pre-polymerization is carried in a liquid hydrocarbon diluent or in the gas phase using a batch process, a semi-continuous process, or a continuous process.

The following examples are given to illustrate but not limit the present disclosure.

EXAMPLES

Testing Methods
  Melting temperature (Tm): ASTM-D2117.
  Melt Index (MIE): ASTMD1238, condition E.
  Density: ASTM-D1505.

Comparative Example 1 and Example 1

Preparation of the Catalyst System

A solution of dimethylsilyl{(2,4,7-trimethyl-1-indenyl)-7-(2,5-dimethyl-cyclopenta[1,2-b:4,3-b']-dithiophene)} zirconium dichloride was prepared as describe in Paragraphs [0091]-[0095] of European Patent Publication No. 3 266 824 A1.

Polymerization

The polymerization of ethylene and 1-octene was performed in solution phase in a continuous stirred tank reactor in the presence of the catalyst system. In Comparative Example 1, cyclohexane was used as the inert solvent. In Example 1, no inert solvent was used. The liquid medium was composed of liquid 1-octene. Hydrogen was used as a molecular weight regulator. The polymerization conditions are reported in Table 1, which also reports the solution composition and the polyolefin concentration in the polymerization solution. The characterization data of the obtained polymers are reported in Table 2.

TABLE 1

|  |  | Comp. Ex. 1 | Example 1 |
|---|---|---|---|
| Temperature | ° C. | 100 | 95 |
| Pressure | barg | 32 | 32 |
| Polymer concentration | % wt | 18 | 15 |
| Monomers concentration | % wt | 21 | 85 |
| Solvent concentration | % wt | 61 | 0 |
| Hydrogen/ethylene | mol/mol · 10$^6$ | 7396 | 8854 |
| Residence time | min | 138 | 106 |
| Mileage | kg/gMe (*) | 2036 | 8193 |

(*) kilograms of polymer per gram of metallocene catalyst

TABLE 2

|  |  | Comp. Ex. 1 | Example 1 |
|---|---|---|---|
| Tm | ° C. | 33.1 | 54.5 |
| MIE | g/10 min | 1.3 | 2.6 |
| Density | g/cc | 0.866 | 0.855 |
| Ethylene | % wt | 60 | 57.4 |
| 1-Octene | % wt | 40 | 42.6 |

The polymeric solution containing ethylene/1-octene copolymer was withdrawn from the polymerization reactor and transferred by a screw pump to a separation step, performed in a sequence of three volatilization chambers operated at a decreasing pressure.

Polymer Separation and Monomer Recovery

The polymeric solution was introduced into the first volatilization chamber, wherein the ethylene/1-octene copolymer, in the form of a polymer melt, settled by gravity to the bottom of the chamber. Simultaneously, the unreacted monomers were released away from the polymer melt and flowed upward to the top of the chamber, from which the unreacted monomers were withdrawn and conveyed to the monomer recovery section.

The polymer melt was discharged from the bottom of the first volatilizer and introduced into a heat exchanger, thereby raising the polymer melt's temperature to the temperature of the second volatilization chamber. The polymer melt settled by gravity to the bottom of the second volatilization chamber, thereby releasing unreacted monomers.

The polymer melt coming from the second volatilization chamber was introduced into the third volatilization chamber, which was operated under vacuum pressure. The polymer melt settled by gravity to the bottom of the third volatilization chamber, thereby releasing further amounts of unreacted monomers.

The top and bottom temperature, as well as the operating pressure in each volatilization chamber are reported in Table 3, which also shows the residual content of ethylene and 1-octene inside the polymer melt discharged from each volatilization chamber.

TABLE 3

|  |  | Comp. Ex. 1 | Example 1 |
|---|---|---|---|
| 1$^{st}$ chamber top/bottom | ° C. | 196/189 | 189/191 |
| 2$^{nd}$ chamber top/bottom | ° C. | 162/185 | 176/202 |

TABLE 3-continued

|  |  | Comp. Ex. 1 | Example 1 |
| --- | --- | --- | --- |
| 3$^{rd}$ chamber bottom | ° C. | 199 | 172 |
| Ethylene discharged | kg/h | 1.2 | 8.8 |

In both cases, the content of unreacted monomers in the polymer melt was negligible at the outlet of the third devolatilization chamber.

Example 2 and Comparative Example 2

An ethylene/1-octene copolymer AFFINITY® PL 1880G available from The Dow Chemical Company, having a melting temperature (Tm) of 99° C., was admixed at room temperature with 1-octene (20% AFFINITY—80% 1-octene). The temperature was gradually increased at a gradient of 0.17° C./min until the copolymer was completely dissolved. At that point, the temperature measured was 95° C. Based on that information, a simulation of the polymerization process of ethylene and 1-octene with no inert solvent to obtain the AFFINITY copolymer was run at 130° C. (Example 2) and at 110° C. (Comparative Example 2). The simulation of Example 2 resulted in smooth operation while the simulation of Comparative Example2 resulted in operational upsets. According to the simulations, the polymerization heat was removed in an external cooler through which the reacting system was recycled by a recirculation pump. The service fluid of the cooler was jacket water. The heat transfer resulted from a temperature difference between the two sides of the cooler. The jacket water flowing in the cooler was colder than the reacting system, thereby removing the polymerization heat.

As the jacket water gets colder than the solubility temperature of the polymer in the reacting system, some polymer segregates from the polymer solution as a sticky solid and fouls the process side of the heat transfer surface. Additionally, the heat transfers become more difficult, the temperature controllers worsen the situation by further cooling the jacket water, the reactor operation becomes unstable in temperature, and the reactor content becomes inhomogeneous.

What is claimed is:

1. A process for continuous solution polymerization comprising a step of:
polymerizing a first olefin monomer of formula $CH_2=CHR^1$, wherein $R^1$ is hydrogen or a hydrocarbon radical having from 1 to 8 carbon atoms with a second olefin monomer of formula $CH_2=CHR^2$, wherein $R^2$ is a hydrocarbon radical having from 3 to 8 carbon atoms, in the presence of a polymerization catalyst and in the absence of an inert solvent, at a polymerization temperature (Tp) satisfying the following relationship:

$$Tp \geq Tm + 20° C.$$

wherein Tm is melting temperature of an obtained polymer.

2. The process according to claim 1, wherein the first olefin monomer is selected from the group consisting of ethylene, propylene, 1-butene, 1-pentene, 1-hexene, 4-methyl-1-pentene, 1-octene and 1-decene.

3. The process according to claim 1, wherein the second olefin monomer is selected from the group consisting of 1-pentene, 1-hexene, 4-methyl-1-pentene, 1-octene and 1-decene.

4. The process according to claim 1, wherein the first olefin monomer is ethylene and the second olefin monomer is 1-octene.

5. The process according to claim 1, wherein a content of the second olefin monomer in the obtained polymer products is between 5 and 50% by weight.

6. The process according to claim 1, wherein the continuous solution polymerization is operated at a temperature in a range of from 60 to 150° C.

7. The process according to claim 1, wherein the continuous solution polymerization is operated at a pressure in a range of from 20 to 50 barg.

* * * * *